United States Patent
Skalski

[19]

[11] Patent Number: 6,137,255
[45] Date of Patent: Oct. 24, 2000

[54] APPARATUS AND METHOD OF CONTROLLING A LINEAR MOTOR DOOR OPERATOR

[75] Inventor: Clement A. Skalski, Avon, Conn.

[73] Assignee: Otis Elevator Company, Farmington, Conn.

[21] Appl. No.: 09/364,082

[22] Filed: Jul. 30, 1999

[51] Int. Cl.[7] .................................................. G05B 11/00
[52] U.S. Cl. .......................... 318/687; 318/615; 318/560; 318/561; 318/616; 318/628
[58] Field of Search ..................... 318/615, 560, 318/616, 561, 628, 687

[56] References Cited

U.S. PATENT DOCUMENTS

| | | | |
|---|---|---|---|
| 4,263,627 | 4/1981 | Rose et al. .............................. | 318/561 |
| 4,792,737 | 12/1988 | Goff et al. ............................. | 318/615 |
| 6,026,339 | 2/2000 | Williams .................................. | 318/615 |

*Primary Examiner*—Karen Masih

[57] ABSTRACT

A control system (10) for a door operator (12) for moving a door includes a position sensor (54) to be coupled to the door (28) for sensing the position of the door and generating a position signal. An acceleration sensor (48) is to be coupled to the door for sensing the acceleration of the door (28) and generating an acceleration signal. An integrator (50) integrates the acceleration signal to generate a first velocity signal. A differentiator (56) differentiates the position signal to generate a second velocity signal. A blending filter (42) blends the first and second velocity signal to generate a filtered velocity signal, and a controller (32) regulates the velocity of the door (28) in response to the time and position of the door in a door open or close operation.

20 Claims, 6 Drawing Sheets

| CLOSE1 | |
|---|---|
| time (seconds) | pos (mm) |
| 0 | 0 |
| .3 | 50 |
| 3.3 | 1000 |
| 3.8 | 1086 |
| 5 | 1086 |

| OPEN1 | |
|---|---|
| time (seconds) | pos (mm) |
| 0 | 0 |
| .3 | 50 |
| 2.0 | 1000 |
| 2.5 | 1086 |
| 5 | 1086 |

APPARATUS AND METHOD OF CONTROLLING A LINEAR MOTOR DOOR OPERATOR

The present invention relates to a control system for moving a door, and more particularly relates to a control system for a linear motor elevator door operator.

BACKGROUND OF THE INVENTION

Previous elevator door systems employing single-sided linear induction motors typically generate large attractive forces between the motor primary and secondary. The large attractive force makes it difficult to maintain a desirably small (i.e., 1 mm) air gap between the primary and secondary. Further, the high attractive force may result in unacceptable vibration levels. Such control systems also typically employ a position encoder for controlling the position of the movable elevator door as a function of time in a door close or open operation. A drawback with door control systems which use a position encoder alone is that such encoders tend to be expensive and require high resolution and associated sophisticated signal processing.

It is therefore an object of the present invention to provide a control system for a linear motor elevator door operator which avoids the drawbacks and disadvantages of such prior control systems.

SUMMARY OF THE INVENTION

In one aspect of the present invention, a control system for a door operator for moving a door includes a position means to be coupled to the door for sensing the position of the door and generating a position signal. An acceleration means is to be coupled to the door for sensing the acceleration of the door and generating an acceleration signal. An integration means integrates the acceleration signal to generate a first velocity signal. A differentiator means differentiates the position signal to generate a second velocity signal. A filter means blends the first and second velocity signals to generate a filtered velocity signal, and a control means controls the velocity of the door in response to the position and velocity of the door.

In a second aspect of the present invention, a control system for a door operator for moving a door includes a position controller having an input and an output. A first summing circuit has a positive input, a negative input and an output. The positive input of the first summing circuit is for receiving a position dictation signal; the negative input is for receiving a position feedback signal, and the output of the first summing circuit is coupled to the input of the position controller. A velocity controller has an input, and an output to communicate with a door operator. A second summing circuit has a positive input, a negative input and an output. The positive input of the second summing circuit is coupled to the output of the position controller; the negative input is for receiving a velocity feedback signal, and the output of the second summing circuit is coupled to the input of the velocity controller. A position sensor and an acceleration sensor each have an input and an output. The input of each of the position sensor and the acceleration sensor is to be coupled to the door movable by the door operator. An output of the position sensor is coupled to the negative input of the first summing circuit for transmitting the position feedback signal thereto. An integrator has an input and an output. The input of the integrator is coupled to the output of the acceleration sensor. A differentiator has an input and an output. The input of the differentiator is coupled to an output of the position sensor. A blending filter has first and second inputs and an output. The first input of the blending filter is coupled to the output of the integrator; the second input is coupled to the output of the differentiator, and the output carrying the velocity feedback signal is coupled to the negative input of the second summing circuit.

In a third aspect of the present invention, a method of controlling a door operator that moves a door includes detecting the acceleration of a movable door and generating an acceleration signal therefrom. A first velocity signal is generated from the acceleration signal. The position of the movable door is detected and a position signal is generated therefrom. A second velocity signal is generated from the position signal, and the first velocity signal and the second velocity signal are blended to generate a filtered velocity signal for controlling the door movement.

An advantage of the present invention is that the control system offers good, closed-loop regulation of door velocity to ensure a well damped or controlled operation.

A second advantage is that the control system defines door motion using simple position vs. time profiles.

A third advantage is that the control system obtains a high-quality velocity feedback signal by employing an inexpensive linear encoder and accelerometer.

A fourth advantage is the use of variable current or voltage motor excitation at a constant frequency to simplify control and minimize undesirable normal forces and vibrations in the door dynamics.

Other objects and advantages of the present invention will become apparent in view of the following detailed description and accompanying drawings.

DETAILED DESCRIPTION OF THE PREFERRED EMBODIMENT

Figure 1:
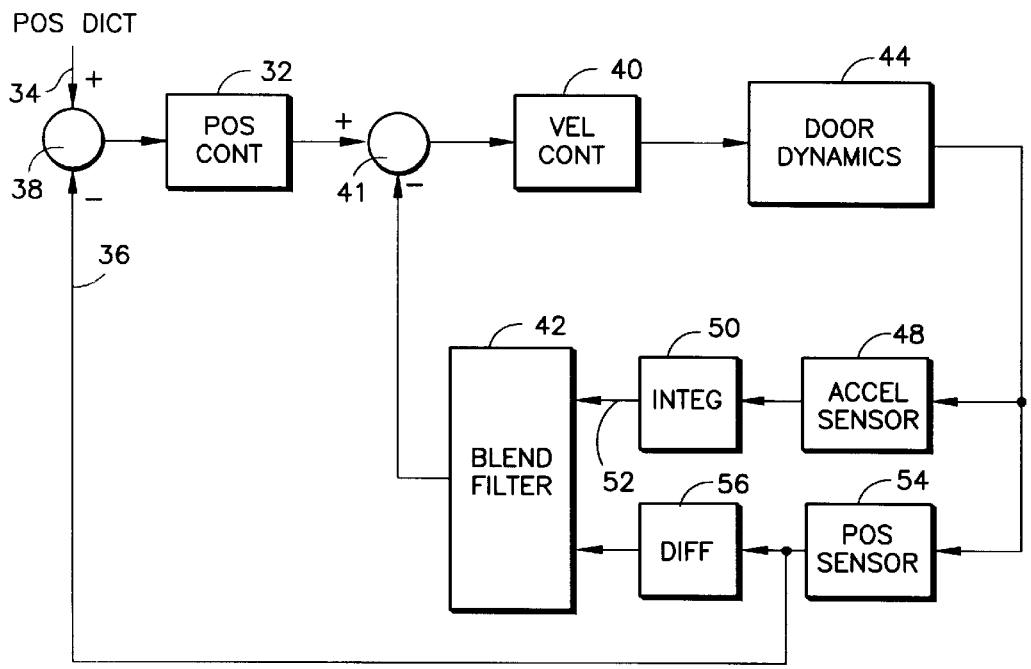
FIG. 1 schematically illustrates an elevator door control system embodying the present invention.
Figure 2:
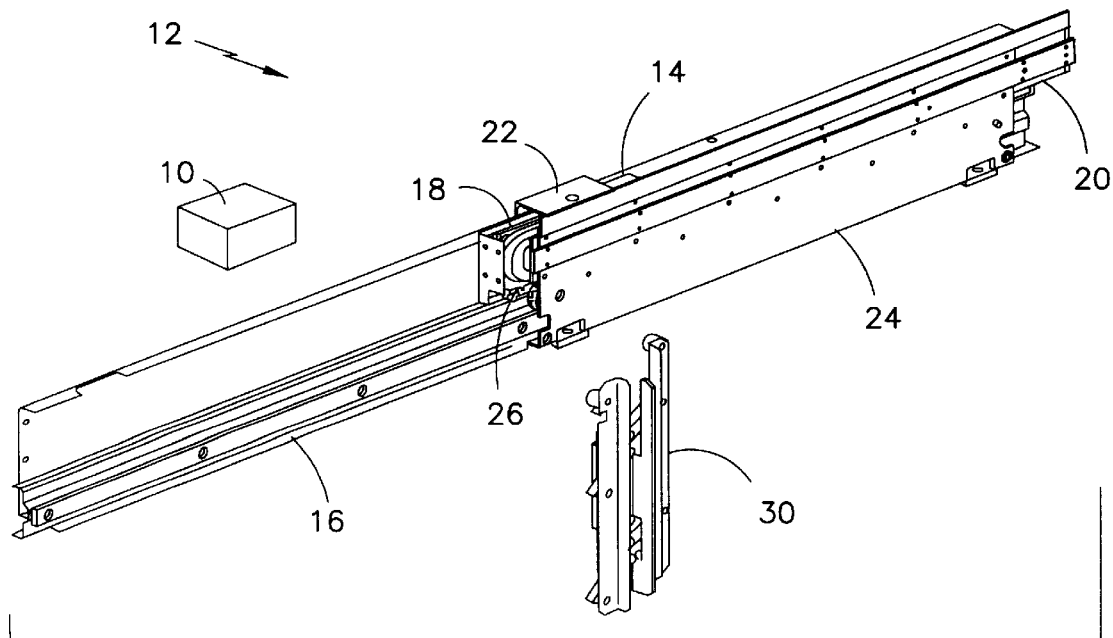
FIG. 2 is a perspective view of a door operator employing the door control system of FIG. 1.
Figure 3:
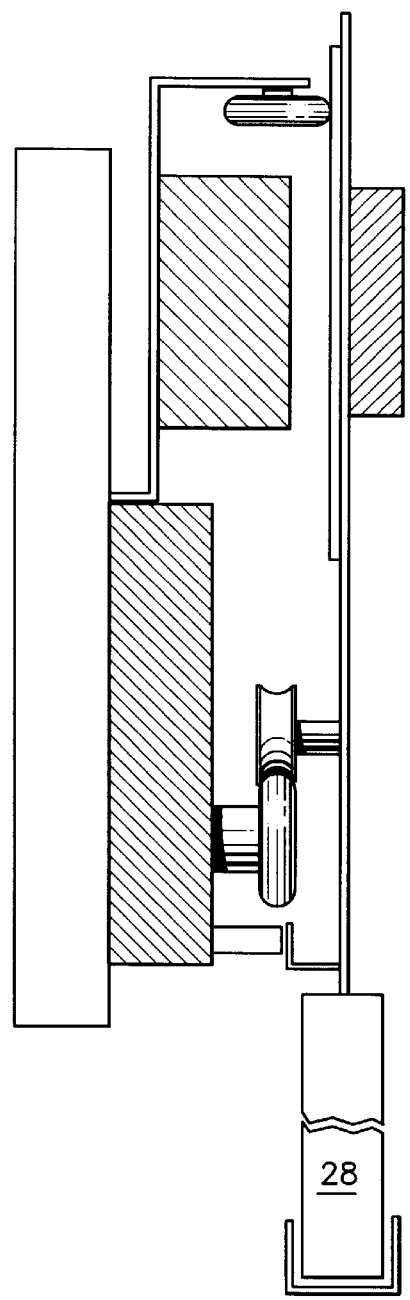
FIG. 3 is a schematic side elevational view of the door operator of FIG. 2.

With reference to FIGS. 1–3, an elevator door control system (control system) embodying the present invention is generally designated by the reference number 10. An example of a door operator employing the control system 10 is generally designated as 12 (see FIGS. 2 and 3); however, other door operators may also be employed with the control system.

The control system 10 to be described offers good, closed-loop regulation of door velocity to ensure a well damped or controlled operation. Second, the control system 10 defines door motion using simple position vs. time profiles. Third, the system 10 obtains a high-quality velocity feedback signal by employing a linear encoder and accelerometer. Fourth, the use of variable current or voltage motor excitation at a constant frequency simplifies control and minimizes undesirable normal forces and vibrations in the door dynamics.

The door operator 12, preferably a linear motor (LIM) door operator, includes a header 14, a header/track assembly 16 supporting a linear motor having a motor primary 18 and a motor secondary 20. A bearing system 22 facilitates relative movement between the motor primary 18 and the motor secondary 20. A door hangar 24 is coupled to the motor secondary 20 for movement with the motor secondary along the length of the header/track assembly 16. An encoder 26, such as a linear or vane encoder, senses the position of an associated elevator door 28 (see FIG. 3) along the length of the header/track assembly 16. An interlock 30 couples the elevator door 28 and associated hoistway door (not shown) to one another in order to move them in unison.

With reference to FIG. 1, the control system 10 includes a position controller 32 for receiving the difference between a position dictation signal 34 and a position feedback signal 36 via a first summing block 38. An input of a velocity controller 40 receives a signal via a second summing block 41 which is the difference between the output signal of the position controller 32 and an output of a conventional blending filter 42, the purpose of which is explained below. Preferably, the position controller 32 and the velocity controller 40 are proportional controllers. A door dynamics section 44, which includes a motor controller, the door drive and motor, and door system, receives a velocity control signal generated by the velocity controller 40 to move the elevator door 28 at the proper velocity as a function of its position. An acceleration sensor or accelerometer 48, communicating with the elevator door 28 within the door dynamics section 44, has an output coupled to an input of an integrator 50 which may be implemented by either hardware or software to generate a first velocity signal from the acceleration sensor. An output of the integrator 50 is coupled to a first input 52 of the blending filter 42. A position sensor 54 communicates with the elevator door 28 within the door dynamics section 44. The position sensor 54 is preferably a linear encoder, such as an inexpensive and conventional encoder including a punched metal strip which employs optical detection. An output of the position sensor 54 is coupled to a differentiator 56 to generate a second velocity signal from the position sensor, and to a negative input of the first summing circuit for transmitting the position feedback signal thereto. An output of the differentiator 56 is coupled to a second input of the blending filter 42. An output signal of the blending filter 42 forming a velocity feedback signal is subtracted from the output signal from the position controller 32 at the second summing block 41.

The linear motor of the embodiment of FIG. 1 is a current or voltage controlled single-sided linear induction motor (SLIM) employed in a mid-range linear motor (MRLIM) door system. The employment of a SLIM is attractive because of low cost. The driven element or motor secondary 20 in the MRLIM operator is preferably a strong copper sheet joined to an iron structure that provides both a flux return path and rigidity. It has been discovered that precise, rapid and robust force control is achieved in a SLIM door drive by mitigating the potentially large attractive force between the motor primary 18 and the motor secondary 20. This is accomplished by a SLIM and use of a variable current or voltage excitation of the linear motor at a generally constant frequency in the range of about 15 Hz to about 30 Hz to minimize attractive force, and more preferably at a generally constant frequency of about 15 Hz to also minimize the acoustic effects (i.e., vibrations). The motor excitation frequency is high enough to mitigate undesirable normal force and low enough to reduce risk of exciting structural modes in the elevator door and to ensure that vibrations that do occur are close to inaudible. The linear motor preferably operates at high slip, thereby acting more as a force actuator than as an induction motor. It is not necessary to determine the speed of the driven element (i.e., the motor secondary 20) to obtain good force control. The motor time constant is on the order of, for example, 5 ms, making it highly controllable without resorting to a more complex and expensive vector control technique. Magnetic levitation is employed to offset the attractive force between the motor primary 18 and the iron in the motor secondary 20. Without such attention to the attractive force, it would be difficult to maintain a desirably small air gap of, for example, 1 mm therebetween. Further, a high attractive force may result in unacceptable door vibration levels.

In operation, an acceleration signal generated by the acceleration sensor or accelerometer 48 is integrated to provide the first velocity signal which is a very smooth and accurate estimation of door velocity over a short time period. The position signal generated by the position sensor 54 is differentiated (numerically) to provide the second velocity signal which is a noisy but drift-free estimation of velocity. The blending filter 42 provides smoothing of the second velocity signal derived from the position sensor 54, removes drift error from the first velocity signal derived from the accelerometer 48, and then combines the two velocity signals to generate a filtered velocity signal which is an accurate and very smooth estimation of door velocity. The filtered velocity signal coming from the blending filter 42 may alternatively be obtained by means of a position encoder alone, but such an encoder would be expensive and require high resolution, and may not be as rugged and reliable as a coarse resolution encoder fabricated of punched steel. Further, if only an encoder were employed, more sophisticated signal processing would be required if the resolution is not high.

Figure 5:
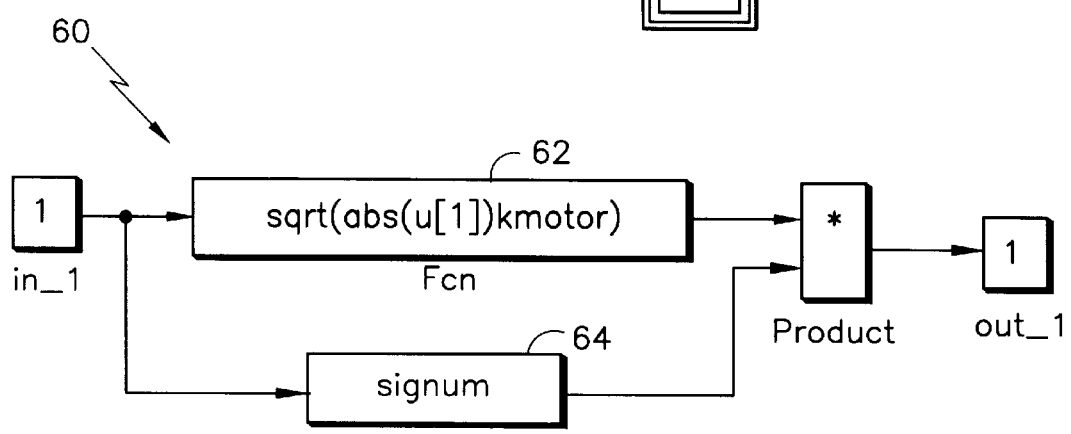
FIG. 5 is an operational block diagram of the control block of the elevator control system illustrated in FIG. 4.
Figure 4:
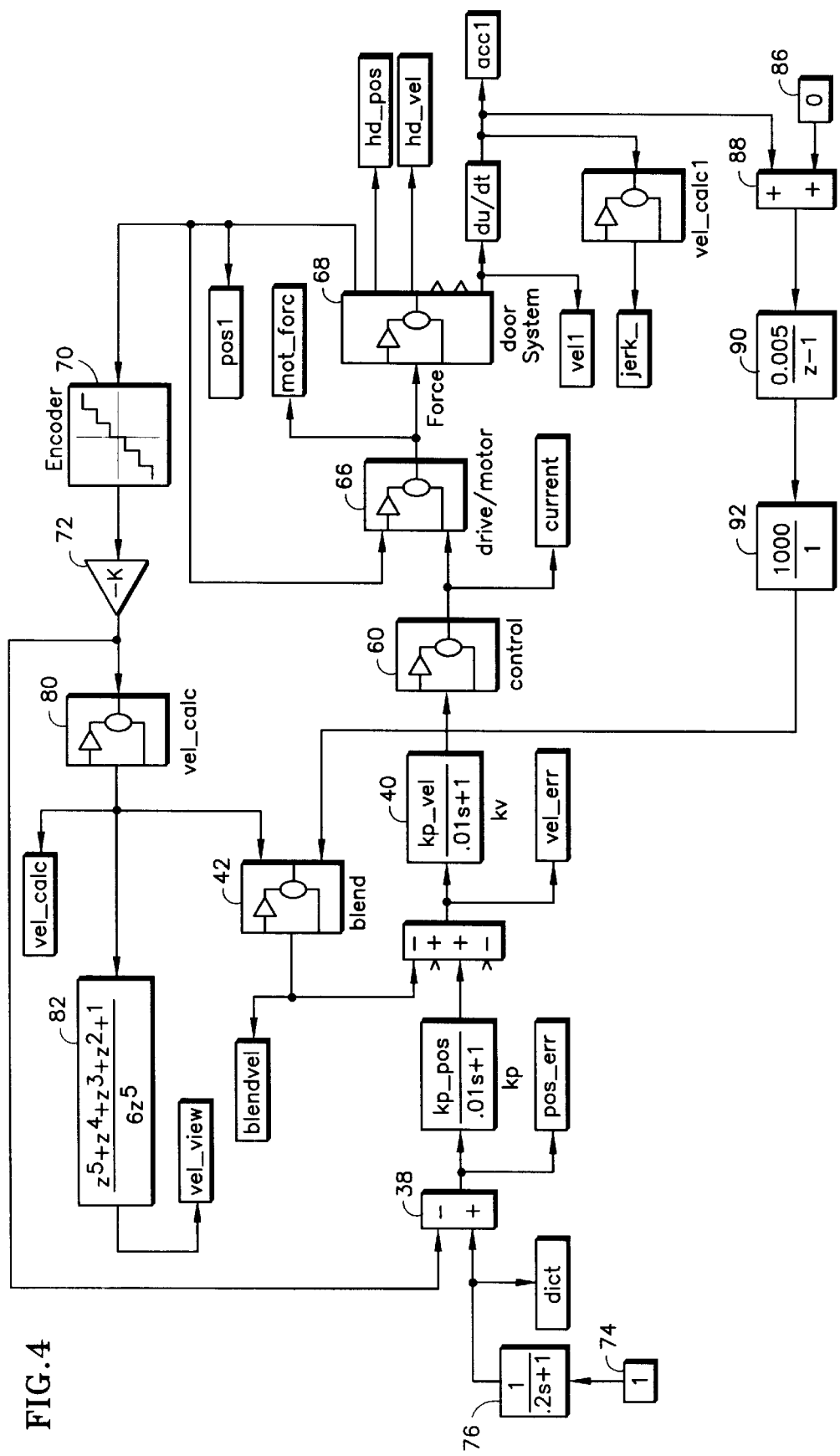
FIG. 4 is an operational block diagram of the elevator door control system of FIG. 1.

FIG. 4 illustrates an operational block diagram describing the elevator door control system 10 in greater detail. The operational block diagram models one of several possible implementations of the door control system 10. The block 60 is the motor controller whose operation is more fully shown in FIG. 5. With respect to motor current, the motor controller 60 as modeled takes the square root of the absolute value of the input received from the velocity controller 40 and then assigns the sign of the input to it (block 62 of FIG. 5). A scale factor is included in the operation. The signum function 62 is +1 or −1 depending on the sign of its argument. The value of kmotor is defined, by way of example, to be 200/7.502 so that a motor current of 7.5 amps results in a desired 200 N force applied to the elevator door.

Figures 6, 7A, 7B:
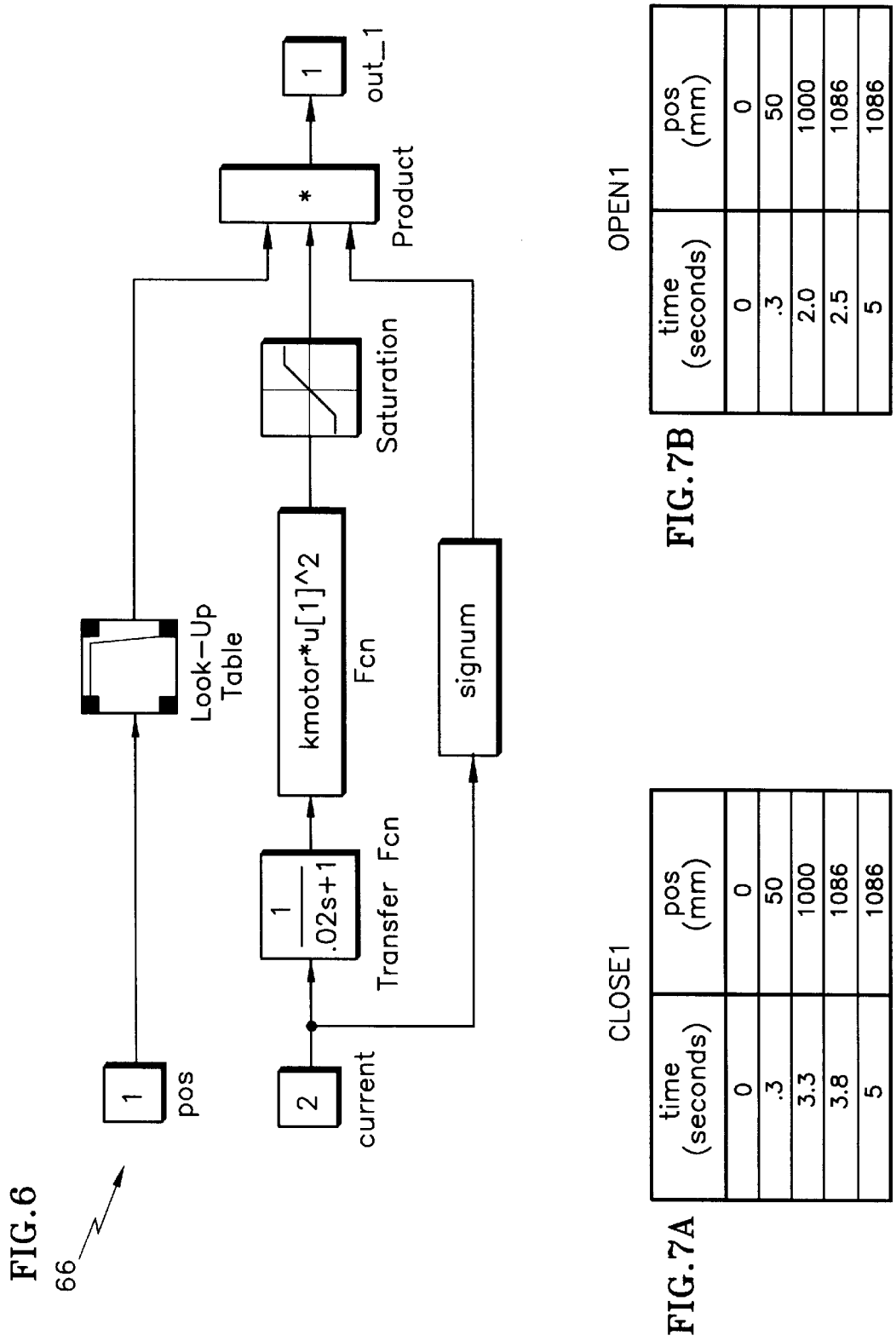
FIG. 6 is an operational block diagram of the drive/motor block of the elevator door control system illustrated in FIG. 4.
FIG. 7A is a close elevator door profile illustrating door position as a function of time.
FIG. 7B is an open elevator door profile illustrating door position as a function of time.

With reference to FIG. 6, a drive/motor block 66 of FIG. 4 models the motor as a 20 ms lag. The drive motor block 66 further models the square 15 law characteristic, saturation and partial engagement of the motor secondary. The output of the drive motor block 66 is a force that is applied to the elevator door, as illustrated in a door system block 68 of FIG. 4. The drive motor block 66 preferably includes a coupler model, and the primary translational mode and a rotational mode. The rotational mode may be excited if the force application of the elevator door is not coincident with the center of gravity. The position of the elevator door dynamics is quantized in coarse increments of, for example, 1.0 mm with an inexpensive linear encoder, illustrated in FIG. 4 by encoder block 70. An output of the encoder block 70 is scaled from meters to millimeters using a scale block 72. The scaled signal then becomes the position feedback signal that is fed to the first summing block 38.

The input to the first summing block 38 is the dictation signal "dict". This signal is obtained by injecting at block 74 a piecewise-linear definition of the position vs. time desired for door operation. This signal is filtered using a 0.2 second lag filter 76 to obtain "dict". The lag filter 76 smoothes out the sharp transitions in the piecewise linear position dictation signal.

FIGS. 7A and 7B are examples illustrating desired door position vs. time profiles for close and open operations, respectively. With reference to FIG. 7A, for example, the elevator door which is movable 1086 mm from its opened to closed positions is at an opened or reference position of 0 mm at the initialization of a door close operation (i.e., at time=zero), at a position of 50 mm from this starting position at a time of 0.3 seconds into the door close operation, at a position of 1000 mm at a time of 3.3 seconds into the door close operation, and at a fully closed position of 1086 mm at 3.8 seconds and thereafter into the door close operation.

With reference to FIG. 7B, for example, the elevator door which is movable 1086 mm from its closed to opened positions is at a closed or reference position of 0 mm at the initialization of a door open operation (i.e., at time=zero), at a position of 50 mm from this starting position at a time of 0.3 seconds into the door open operation, at a position of 1000 mm at a time of 2.0 seconds into the door open operation, and at a fully open position of 1086 mm at 2.5 seconds and thereafter into the door open operation. The door close profile is slower than the door open profile for the obvious reason of passenger safety.

With reference again to FIG. 4, the velocity loop of the operational block diagram will now be described. Block 80 or "vel_calc" computes the door velocity from the quantized position signal generated by the encoder 70. The number of position increments over two cycles is determined. The number of position increments is multiplied by the position quantization and then divided by two clock periods to provide an estimate of door velocity. A sample time of 5 ms, for example, is employed. The quantization of velocity is somewhat coarse, such as 1.0 mm/0.01 sec=100 mm/s.

The output signal of the velocity calculation block 80 is coupled to the blending filter 42 and to a running average block 82 (see FIG. 4) whose output signal is labeled "vel_view". The signal "vel_view" is the result of a six-point running average. This signal is used to check door overspeed (see FIG. 11). Further, this velocity signal may be employed alone to initialize the door operator.

Figure 8:
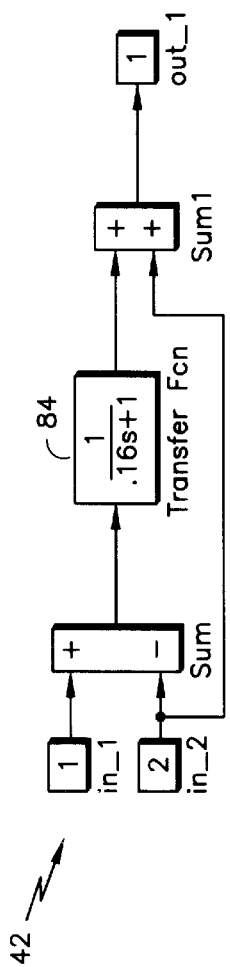
FIG. 8 is an operational block diagram of the blending filter block of the elevator door control system illustrated in FIG. 4.

The velocity loop is closed using the signal from the blending filter 42, having an operation as modeled, for example, in FIG. 8. The velocity signal from the encoder is passed through a 0.16 lag filter 84 which eliminates most of the high-frequency noise in the filtered velocity signal, but introduces an intolerable time delay (prevents closure of sufficiently fast velocity loop). This problem is resolved by introducing the velocity signal derived from the door-mounted accelerometer. The accelerometer signal has an excellent high-frequency response, but is erroneous at low frequencies because of a bias caused both by imperfections and responsiveness to gravitational acceleration. The bias or offset results in an ever increasing error in the velocity estimation performed by integration.

The blending filter 42 performs the operation:

encoder_vel*filter_transfer_fcn+accel_derived_vel*
(1-filter_transfer-fcn)

where:
"encoder_vel" is the first velocity signal derived from the position sensor,
"filter_transfer_fcn" is the transfer function of the blending filter, and
"accel_derived_vel" is the second velocity signal derived from the acceleration sensor.

The operation of the blending filter 42 permits attainment of the excellent low-frequency signal response of the encoder and the excellent high-frequency response of the accelerometer. The technique results in clean, essentially bias-free estimates of door velocity.

As shown in FIG. 4, the block 86 introduces acceleration biases into the operation. For a bias of, for example, 0.1 M/s$^2$ (10 mg), the landing error is about 4 mm. If the blending filter time constant is reduced from 160 ms to 80 ms, the landing error decreases to 2 mm and the jitter in the blended velocity increases only slightly. The control system 10 works adequately with a 160 ms filter. It is important to zero out the output of the accelerometer prior to each door operation to ensure the system 10 operates properly. This zeroing out is accomplished easily and quickly in a computer-based control system.

As shown in FIG. 4, the blocks 88–92 are employed to model the integration of the accelerometer signal. The acceleration is directed into a summing block 88 into which bias can be injected. The output of the summing block 88 is coupled to a discrete integrator 90. The block 92 with gain 1000 is employed to convert the integrated acceleration signal from meters/s to millimeters/s.

Turning now to FIGS. 9A–9D, an example of the performance of the control system 10 is illustrated on a 1.1 meter, 200 kg single-slide door. The position dictation signal and actual position of the door are respectively identified by curves 100, 102 in FIG. 9A. The dictation is defined using an"S" curve consisting of four straight lines. The smoothness of the dictation sent to the position controller 32 is a result of employing the 200 ms lag filter 76. The tracking delay in the position control is approximately ¼ second.

Figure 9A:
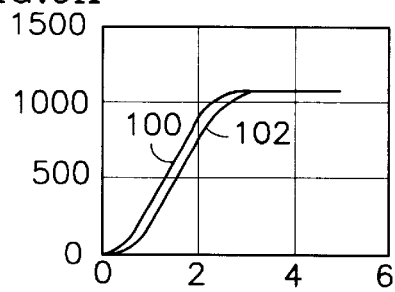
FIG. 9A is a graph illustrating door position dictation and door position vs. time for a door open operation.
Figure 9B:
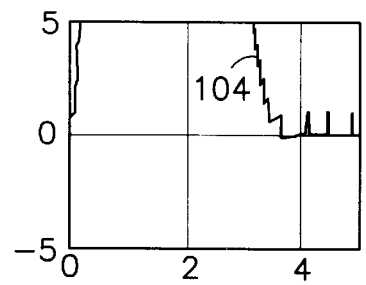
FIG. 9B is a graph illustrating door position error vs. time for a door open operation.
Figure 9C:
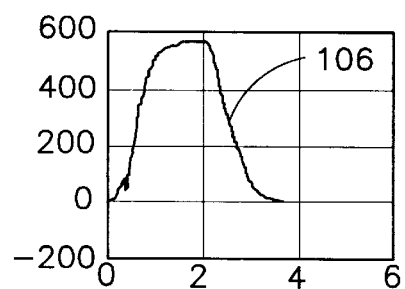
FIG. 9C is a graph illustrating door velocity vs. time for a door open operation.
Figure 9D:
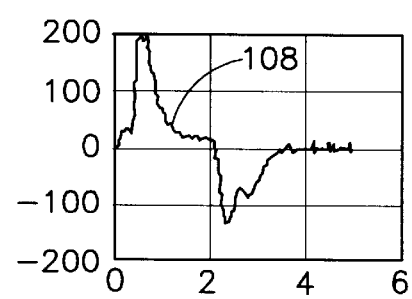
FIG. 9D is a graph illustrating motor force vs. time for a door open operation.

As shown in FIG. 9B, a door position vs. time curve 104 illustrates a flight time of 3.5 seconds and a landing accuracy of 1.0 mm. With reference to FIG. 9C, a door velocity vs. time curve 106 is smooth except for the period of engagement with the coupler. The curve 106 is the actual door velocity as labeled "vel1" in FIG. 4. The curve 106 is a graph of door velocity determined by the blending filter 42 superimposed on the actual door velocity. For all practical purposes, the velocity of the door as determined by the blending filter 42 and "vel1" are identical. If "vel_calc" (velocity determined using only an encoder) had been displayed, the velocity signal would have shown quantization steps at 100 mm/s intervals. The complementing of the encoder with an accelerometer results in dramatic improvements in the velocity estimation. With reference to FIG. 9D, the curve 108 illustrating force vs. time shows the motor on the verge of saturation during acceleration. It indicates that the motor can give acceptable performance.

The closing operation is similar to the open operation, but the velocity is preferably restricted to avoid exceeding a kinetic energy of 10 Joules (Watt-sec). The flight time is about 4.8 seconds. A force exceeding 100 N is required for approximately ¼ second, and a peak force is about 150 N.

Figure 10A:
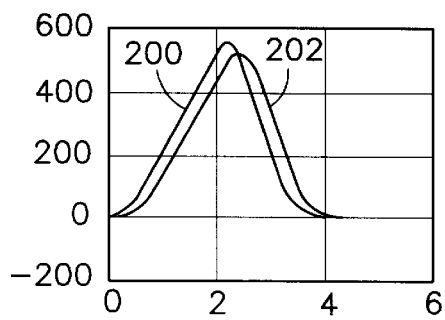
FIG. 10A is a graph illustrating door position dictation and door position vs. time for a door reversal operation.
Figure 10B:
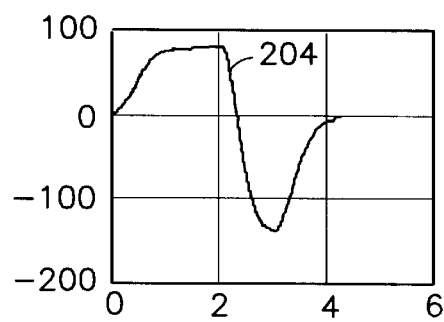
FIG. 10B is a graph illustrating door position error vs. time for a door reversal operation.
Figure 10C:
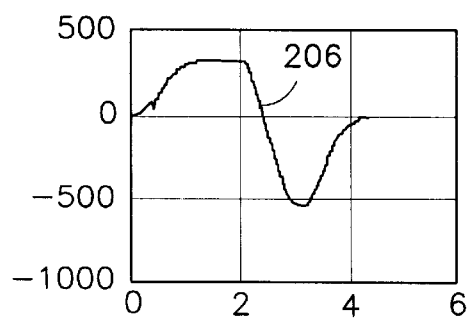
FIG. 10C is a graph illustrating door velocity vs. time for a door reversal operation.
Figure 10D:
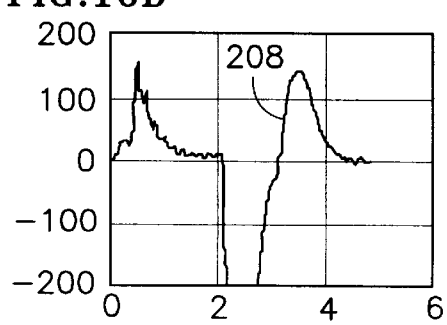
FIG. 10D is a graph illustrating motor force vs. time for a door reversal operation.

An example of employing the control system 10 in a door reversal operation is shown in FIGS. 10A–10D. Fast door reversal is accomplished, for example, by direct dictation of 200 N of reversal force for a period of time equal to the momentum/200, where momentum is the product of system mass and velocity. At the initiation of a reversal pulse, a profile to open is commanded immediately. The reversals can all be accomplished in less than 60 mm. The graphs of FIGS. 10A–10D illustrate, as an example, the command of a door reversal at a half-closed position starting at 2.06 seconds into a close operation. As shown in FIG. 10A, the position dictation signal and actual position of the door are respectively identified by curves 200, 202. As shown in FIG. 10B, door position vs. time is illustrated by curve 204. With reference to FIG. 10C, door velocity vs. time is illustrated by curve 206, and force vs. time is illustrated by curve 208 in FIG. 10D.

Figure 11:
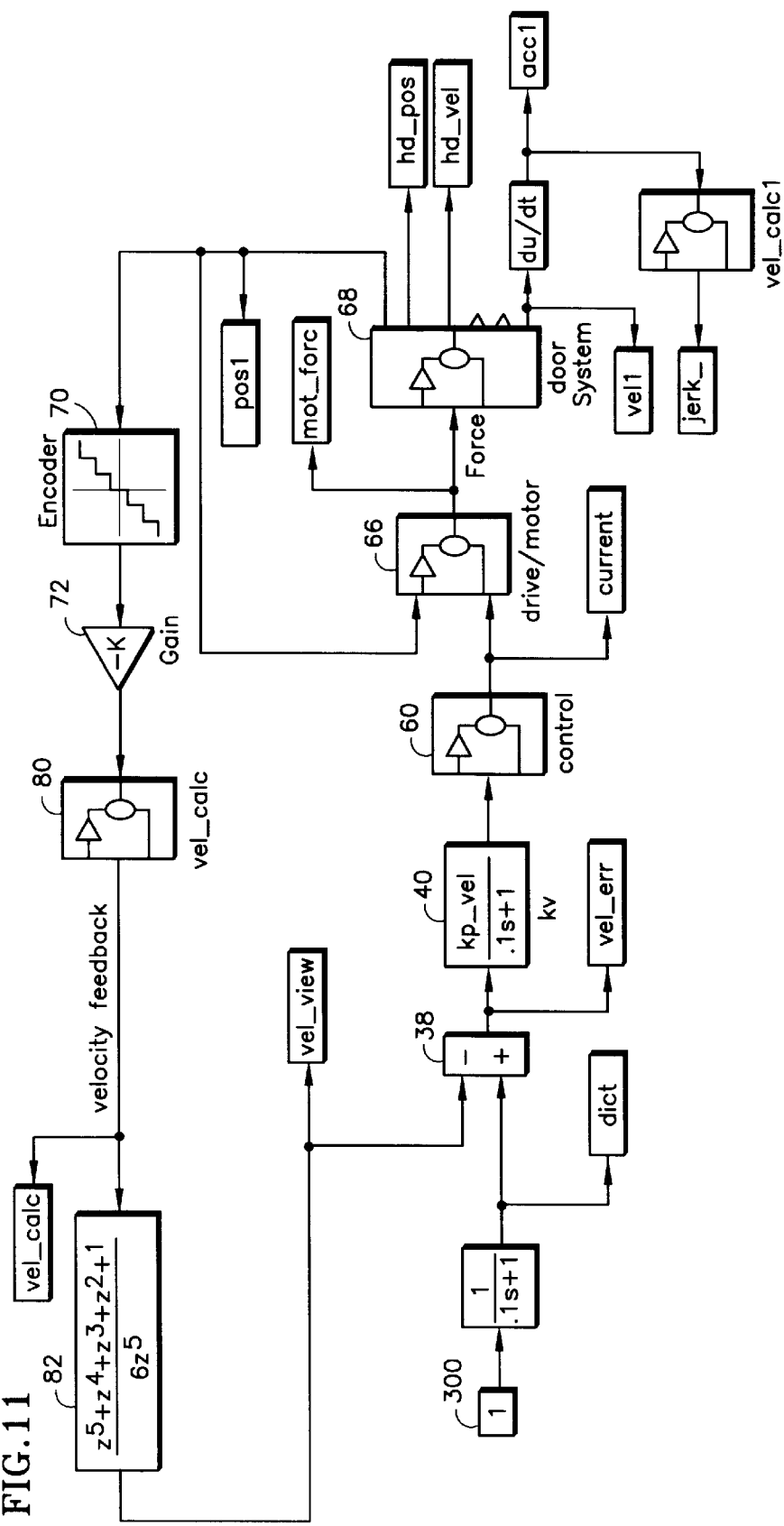
FIG. 11 is an operational block diagram of an initialization procedure of the elevator door control system of FIG. 1.

An initialization procedure is illustrated by way of example with reference to the operation block diagram of FIG. 11. An elevator door is operated using only a velocity control. The velocity dictation is ramped up to, for example, 100 mm/s in 100 ms at the input block 300. Door force is limited to less than full value to prevent potential problems related to the door being blocked, etc. The door closes until it encounters a conventional closed-position sensor. At that time the position encoder 70 is initialized to zero and the velocity dictation is set to zero. The elevator door is then commanded to open at 100 mm/s until a conventional open-position sensor is triggered. At that time the width of the entrance is recorded and velocity is commanded to zero.

The width of the door and the system mass are used to set the velocity and position loop gains and to determine the open and close profiles. Normal operation of the door may then begin. The initialization velocity control preferably has slower response than the control used to operate normally. The velocity loop gain is preferably about ¼ that used in the normal mode. The velocity feedback signal fed back to the velocity controller is "vel_view" as shown in FIG. 11. The signal "vel_view" is obtained, for example, by determining change in position during two clock pulses, dividing by two clock periods, and then passing the resultant through a six cycle running average filter.

The elevator door control system embodying the present invention as shown and described offers several advantages.

First, the control system may be employed with inexpensive and rugged linear motors. Second, the generation of the prescribed motor force is not dependent upon use of an encoder. Third, motor vibrations are minimized since the linear motor attractive force is maintained at a low level. Fourth, motor control is easy to adjust.

While the present invention has been described in a preferred embodiment, it will be understood that numerous modifications and substitutions can be made without departing from the spirit or scope of the invention. For example, the control system may be implemented to control not only the movement of the elevator car doors, but also the movement of the elevator car itself along the hoistway. Accordingly, the present invention has been described in a preferred embodiment by way of illustration, rather than limitation.

What is claimed is:

1. A control system for a door operator for moving a door, comprising:
   position means to be coupled to a door movable by a door operator for sensing the position of the door and generating a position signal;
   acceleration means to be coupled to the door for sensing the acceleration of the door and generating an acceleration signal;
   integration means for integrating the acceleration signal to generate a first velocity signal;
   differentiator means for differentiating the position signal to generate a second velocity signal;
   filter means for blending the first and second velocity signal to generate a filtered velocity signal; and
   control means for controlling the velocity of the door in response to the position and velocity of the door.

2. A control system as defined in claim 1, wherein the position means is a linear encoder.

3. A control system as defined in claim 1, wherein the position means is a linear encoder including a punched metal strip employing optical detection.

4. A control system as defined in claim 1, further including a motor communicating with the control means for moving the door.

5. A control system as defined in claim 1, further including a single-sided linear motor communicating with the control means for moving the door.

6. A control system as defined in claim 4, further including means for exciting the motor at a generally constant frequency.

7. A control system as defined in claim 4, further including means for exciting the motor at a generally constant frequency in the range from about 15 Hz to about 30 Hz.

8. A control system as defined in claim 4, further including means for exciting the motor at a generally constant frequency of about 15 Hz.

9. A control system for a door operator for moving a door, comprising:
   a position controller having an input and an output;
   a first summing circuit having a positive input, a negative input and an output, the positive input for receiving a position dictation signal, the negative input for receiving a position feedback signal, and the output of the first summing circuit being coupled to the input of the position controller;
   a velocity controller having an input, and an output to communicate with a door operator;
   a second summing circuit having a positive input, a negative input and an output, the positive input being coupled to the output of the position controller, the negative input for receiving a velocity feedback signal, and the output of the second summing circuit being coupled to the input of the velocity controller;

a position sensor and an acceleration sensor each having an input and an output, the input of each of the position sensor and the acceleration sensor to be coupled to the door movable by the door operator, and the output of the position sensor coupled to the negative input of the first summing circuit for transmitting the position feedback signal thereto;

an integrator having an input and an output, the input to be coupled to the output of the acceleration sensor;

a differentiator having an input and an output, the input to be coupled to an output of the position sensor; and a blending filter having first and second inputs and an output, the first input coupled to the output of the integrator, the second input coupled to the output of the differentiator, and the output coupled to the negative input of the second summing circuit for transmitting the velocity feedback signal thereto.

10. A control system as defined in claim 9, wherein the position sensor is a linear encoder.

11. A control system as defined in claim 9, wherein the position sensor is a linear encoder including a punched metal strip employing optical detection.

12. A control system as defined in claim 9, further including a motor coupled to an output of the velocity controller for moving the door.

13. A control system as defined in claim 9, further including a single-sided linear motor coupled to an output of the velocity controller for moving the door.

14. A control system as defined in claim 12, further including means for exciting the motor at a generally constant frequency.

15. A control system as defined in claim 12, further including means for exciting the motor at a generally constant frequency in the range from about 15 Hz to about 30 Hz.

16. A control system as defined in claim 12, further including means for exciting the motor at a generally constant frequency of about 15 Hz.

17. A method of controlling a door operator that moves a door, comprising the steps of:

detecting the acceleration of a movable door and generating an acceleration signal therefrom;

generating a first velocity signal from the acceleration signal;

detecting the position of the movable door and generating a position signal therefrom;

generating a second velocity signal from the position signal; and blending the first velocity signal and the second velocity signal to generate a filtered velocity signal for controlling the door movement.

18. A method of controlling a door operator as defined in claim 17, wherein the step of generating a first velocity signal includes integrating the acceleration signal.

19. A method of controlling a door operator as defined in claim 17, wherein the step of generating the second velocity signal includes differentiating the position signal.

20. A method of controlling a door operator as defined in claim 17, further including the step of energizing a linear motor at a constant frequency with the filtered velocity signal to move the door.

* * * * *